(12) United States Patent
Knox

(10) Patent No.: US 6,331,860 B1
(45) Date of Patent: Dec. 18, 2001

(54) METHOD AND APPARATUS FOR STITCHING SCANNED IMAGE SEGMENTS TOGETHER TO FORM AN OVERSIZED DOCUMENT

(75) Inventor: Keith T. Knox, Rochester, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/449,327

(22) Filed: Nov. 24, 1999

(51) Int. Cl.$^7$ ..................................... G06T 15/30
(52) U.S. Cl. ..................... 345/620; 345/622; 345/629; 707/500; 707/515; 707/521
(58) Field of Search .................. 345/620, 621, 345/622, 623, 624, 629, 630, 641; 707/500, 518, 521, 542, 515, 517, 902

(56) References Cited

U.S. PATENT DOCUMENTS

| | | | |
|---|---|---|---|
| 5,057,070 | * 10/1991 | Pidcock | 493/405 |
| 5,331,380 | * 7/1994 | Nasset | 399/377 |
| 5,574,836 | * 11/1996 | Broemmaelsiek | 345/427 |
| 5,611,033 | 3/1997 | Pitteloud et al. | |
| 5,649,032 | 7/1997 | Burt et al. | |
| 5,778,352 | * 7/1998 | Inoue et al. | 707/1 |

OTHER PUBLICATIONS

"Multimedia for biomedical engineer–an educational tool", Singh, A.P, IEEE 1995, pp. 2/109–2/110.*
"Fast address block location on handwritten and machine mail–piece images", Wolf, M, IEEE 1997, pp. 753–757.*

* cited by examiner

*Primary Examiner*—Matthew Luu
*Assistant Examiner*—Thu-Thao Havan
(74) *Attorney, Agent, or Firm*—Fay, Sharpe, Fagan, Minnich & McKee, LLP

(57) ABSTRACT

An oversize document, one that is larger than the platen of the scanner, can be scanned in several segments then stitched together electronically. A method is described to analyze the scan segments to determine the orientation, magnification and translation of the different scanned segments to be stitched together. Operator assistance is required to identify salient features in the different segments to be analyzed. The location of these features is determined by calculating the centroid from a rough crop of each feature. The orientation, magnification, and translation of the scanned segment can all be determined from a comparison of the locations of the identified features. The segments are blended together with standard blending techniques.

24 Claims, 3 Drawing Sheets

METHOD AND APPARATUS FOR STITCHING SCANNED IMAGE SEGMENTS TOGETHER TO FORM AN OVERSIZED DOCUMENT

BACKGROUND OF THE INVENTION

The present invention relates to the document processing arts. It finds application in conjunction with document printing, document scanning, and/or document copying systems and applications where oversized documents are processed.

The problem of scanning a document that is larger than the scannable-area of a platen is frequently encountered with digital scanners and copiers. A need exists to scan an oversized document into a document processing apparatus by scanning separate image segments and then electronically stitching the scanned image segments together to form the complete oversized document.

Accordingly, it has been considered desirable to develop a new and improved method and apparatus for stitching scanned image segments together to form an oversized document which meets the above-stated needs and overcomes the foregoing difficulties and others while providing better and more advantageous results.

SUMMARY OF THE INVENTION

In accordance with one aspect of the present invention, a method for generating image data representing an oversized document is disclosed. The method includes a) displaying image data representing a plurality of scanned image segments of an oversized document; b) selecting a plurality of image features in an overlapping region of a first image segment and a plurality of image features in a corresponding overlapping region of a second image segment; c) determining a centroid value for each of a plurality of the selected image features; d) determining a set of correction values based on the centroid values; and e) merging image data representing the first image segment with image data representing the second image segment based on the set of correction values.

In accordance with another aspect of the present invention, an apparatus for generating image data representing an oversized document is disclosed. The apparatus includes hardware and software for displaying image data representing a plurality of scanned image segments of an oversized document; hardware and software for selecting a plurality of image features in an overlapping region of a first image segment and a plurality of image features in a corresponding overlapping region of a second image segment; hardware and software for determining a centroid value for each of a plurality of the selected image features; hardware and software for determining a set of correction values based on the centroid values; and hardware and software for merging image data representing the first image segment with image data representing the second image segment based on the set of correction values.

In accordance with a third aspect of the present invention, a method for merging together image data representing a plurality of image segments to form an oversized document. The method includes a) selecting a plurality of image features in an overlapping region of a first image segment and a plurality of image features in a corresponding overlapping region of a second image segment; b) determining a centroid value for each of the selected image features; c) determining a scale difference value between a selected image feature of the first image segment and a corresponding image feature of the second image segment based on the centroid values of the selected image feature of the first image segment and the corresponding image feature of the second image segment; d) determining an orientation difference value between a selected image feature of the first image segment and a corresponding image feature of the second image segment based on the centroid values of the selected image feature of the first image segment and the corresponding image feature of the second image segment; e) determining a translation value between a selected image feature of the first image segment and a corresponding image feature of the second image segment based on the centroid values of the selected image feature of the first image segment and the corresponding image feature of the second image segment; and f) merging image data representing the first image segment with image data representing the second image segment based on the scale difference value, the orientation difference value, and the translation value.

In accordance with a fourth aspect of the present invention, a document processing apparatus is disclosed. The apparatus includes an input section adapted to obtain image data representing a plurality of image segments associated with an oversized document to be processed; a data storage section adapted to store the image data; a user interface adapted to display a first image segment and a second image segment and to obtain first feature selection data corresponding to the first image segment and second feature selection data corresponding to the second image segment; and a processor section adapted to a) determine a centroid value for each of the first feature selection data and second selection data, b) determine a scale difference value between the first feature selection data and the second feature selection data based on the corresponding centroid values, c) determine an orientation difference value between the first feature selection data and the second feature selection data based on the corresponding centroid values, d) determine a translation value between the first feature selection data and the second feature selection data based on the corresponding centroid values, and e) merge the image data representing the plurality of image segments based on the scale difference value, the orientation difference value, and the translation value.

One advantage of the present invention is the provision of a method for generating image data representing an oversized document.

Another advantage of the present invention is the provision of a an apparatus for generating image data representing an oversized document.

Yet another advantage of the present invention is the provision of a method for merging together image data representing a plurality of image segments to form an oversized document.

Still another advantage of the present invention is the provision of a document processing apparatus that merges together image data representing a plurality of image segments to form an oversized document.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiments) and are not to be construed as limiting the invention.

DETAILED DESCRIPTION OF THE PREFERRED EMBODIMENT(S)

Figure 1:
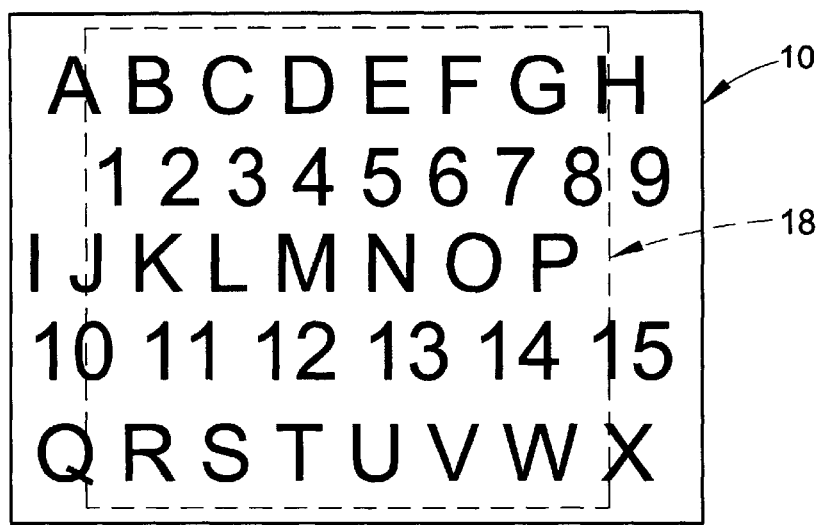
FIG. 1 illustrates an exemplary oversized document to be processed (e.g. scanned or copied)
Figure 2:
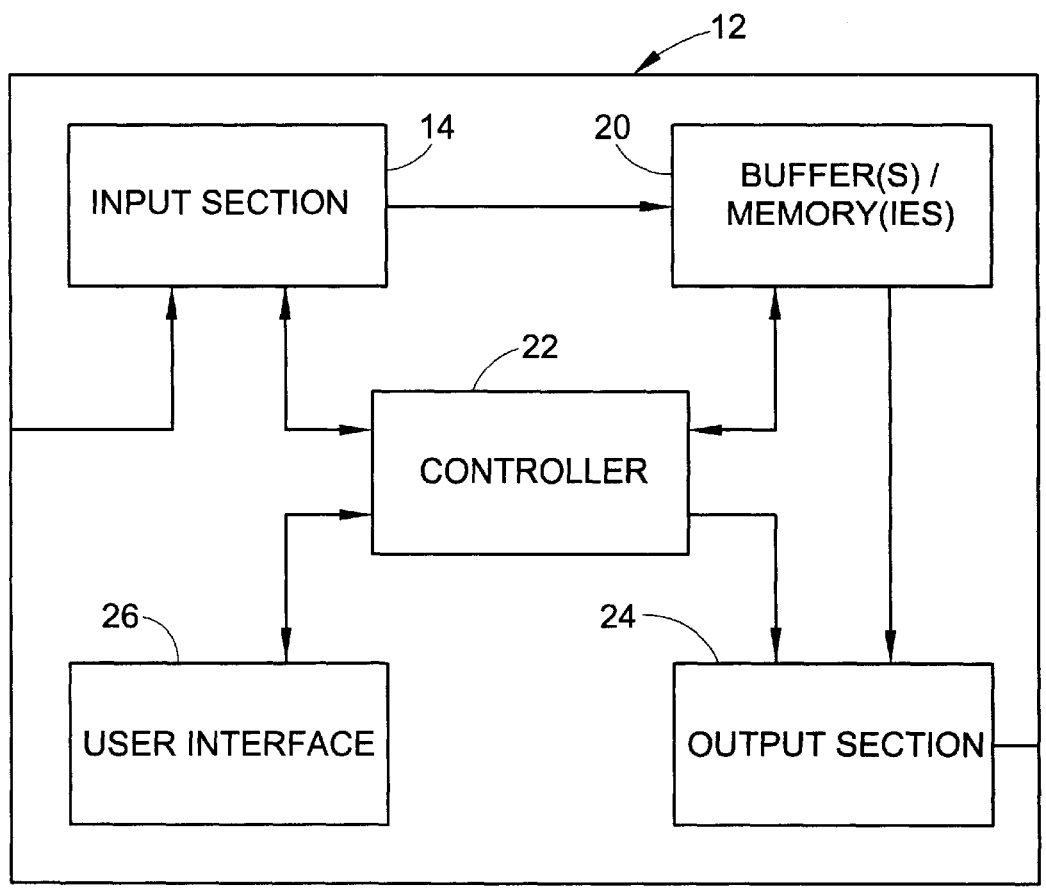
FIG. 2 is a simplified block diagram of an exemplary document processing apparatus that is adapted to electronically stitch together separately scanned image segments of the oversized document of FIG. 1.
Figure 3:
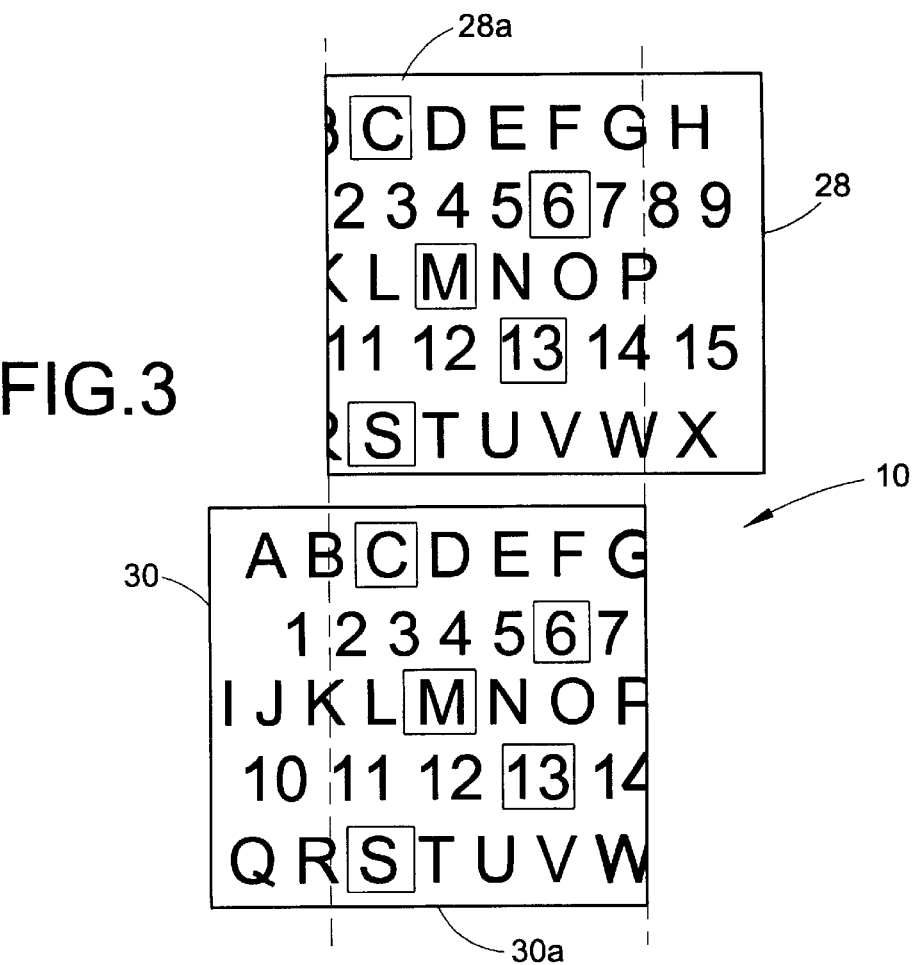
FIG. 3 illustrates a first scanned image segment and a second scanned image segment of the oversized document of FIG. 1.

With reference now to FIGS. 1–3, there is shown a document 10 (having exemplary alpha-numeric indicia) to be scanned into, or copied by, a document processing apparatus 12. The document processing apparatus 12, such as a scanner, digital copier, or the like, includes an input section 14 that acquires image data (e.g. via a serial input port 16), or generates image data (e.g. via a scanner) indicative of a document to be processed.

In the embodiment being described, the input section 14 includes a platen 18 (phantom, FIG. 1) with a scannable area having a length and/or width that is less than the length and/or width of the document 10. Thus, the document 10 can be referred to as an oversized document relative to the platen 18 because the document does not completely fit within the scannable dimensions of the platen. The input section 14 also includes conventional hardware and/or software (not shown) that generates image data (e.g. digital image data) of that portion or region of the document 10 that is positioned over the scannable-area of the platen 18.

The image data that is acquired/generated by the input section 14 is stored in one or more buffers or memories 20. A controller 22, under the direction of software, firmware, micro-code, etc., controls the various operations of the input section 14, buffers/memories 20, an output section 24, and a user interface 26 including data input means (e.g. keyboard, keypad, touch screen, digital pen, etc.) and data display means (LCD screen, video monitor, etc.).

In order to generate image data that completely represents the oversized document 10, the document 10 must be scanned or otherwise input into the document processing apparatus 12 in a number of separate image segments. For instance, the document 10 can be fully represented by first and second image segments 28, 30 (FIG. 3) that are sequentially scanned into the document processing apparatus 12 and stored in the one or more of the buffers/memories 20. Furthermore, the first image segment 28 has a region 28a that overlaps with a region 30a of the second image segment 30.

As described further below, the controller 22, under the direction of software, firmware, micro-code, etc., is configured to i) identify regions of overlap between each of the image segments that represent the oversized document, ii) orient, scale, and/or translate the scanned image segments, and iii) electronically join or "stitch" together the image data representing the scanned image segments to generate the oversized document. Depending on the application, the stitched image data representing the oversized document can be sent to the output section 24 of the document processing apparatus to be i) reduced and printed, ii) printed on large paper (such as with a wide-body printer), or iii) sent over a network, etc.

Figure 5:
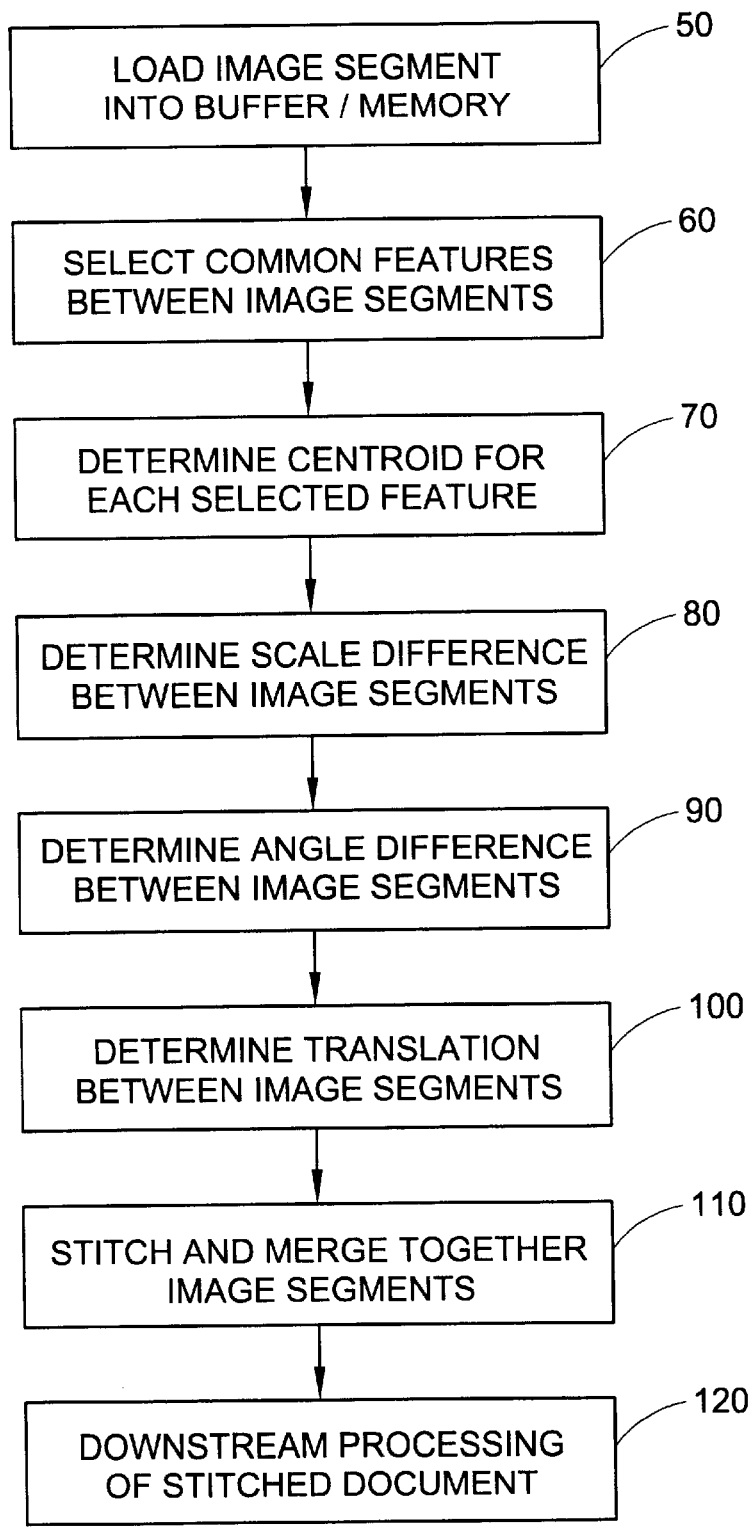
FIG. 5 illustrates a routine for electronically stitching together the separately scanned image segments of FIG. 3.

Referring now to FIG. 5, the oversized document 10 is processed by loading multiple image segments 26, 28 thereof into the document processing apparatus 12 (step 50). In the embodiment being described, a user selects an oversized document processing mode of operation through the user interface 26 of the document processing apparatus 12. The user is then instructed to scan multiple (e.g., two, three, etc.) overlapping image segments of the oversized document into the apparatus 12 via the input section 14 (e.g., scanner and platen). As shown in FIG. 3, the oversized document 10 can be fully represented by the two separately-scanned image segments 28, 30. The image data (representing the image segments 28, 30) that is generated by the input section 14 is stored in the buffer/memory 20.

Thereafter, the image data representing the image segment 28 and the image data representing the image segment 30 are sequentially or simultaneously displayed on the user interface 26. The user is then prompted to identify or otherwise select multiple image features (e.g., at least two, and preferably three or more) that exist in the overlap regions 28a, 30a of the image segments 28, 30 (step 60). One simple method of selecting common image features is to permit the user to use a pointing device, such as a mouse, to draw a rectangular box around each image feature in question. It should be appreciated that a selected image feature might be a text character or some other isolated feature. Preferably, the selected feature should be dark, with the a lighter region surrounding the feature. However, the lighter region does not necessarily have to be white.

Once several features have been selected from the overlapping region (e.g. 28a) of the same image segment. The same image features are then selected in the overlapping region (e.g. 30a) of the second (or third, etc.) image segment. Through the process of identification, the user indicates the same features in all overlapping regions of the image segments. The features are selected in the same order, thus linking the features together. For example, with reference to FIG. 3, five characters (C, 6, M, 13, S) in the first image segment 28 have been selected (e.g. surrounded by a box) in a particular order. Further, the same five characters in the second image segment 30 have been selected in the same order as the characters in the first image segment 28.

The locations of the selected features are then determined in order to calculate the orientation, scale factor, and translation that are necessary to electronically stitch the two image segments 28, 30 together. The location of a selected feature is determined by calculating the centroid (step 70). If the feature is a text character that is isolated and surrounded by white background, the centroid will be located within the bounding box of the character. In the embodiment being described, the centroid is determined by inverting the bounded image data, so that small pixel values (e.g., 0) represent background intensity and larger pixel values (e.g., 255) represent the feature (e.g. character) intensity information.

If the background in not completely white, then the size of the background can influence the position of the centroid. However, by raising the image intensities to a power, such as three (3), before calculating the centroid, the influence of the background can be removed, or at least minimized. In other words, the centroid of the bounded image raised to the third power is independent of the size or shape of the surrounding background image information. Thus, $$x_c = \Sigma x i^3(x,y)/\Sigma i^3(x,y) \qquad \text{Eq.1}$$

$$y_c = \Sigma y i^3(x,y)/\Sigma i^3(x,y) \qquad \text{Eq.2}$$

where $x_c$ and $y_c$ are the coordinates of the calculated centroid, and $i(x,y)$ is the normalized image information:

$$i(x,y) = (I_{max} - I(x,y))/(I_{max} - I_{min}) \qquad \text{Eq.3}$$

This reverses the sense of a dark character, so that the darker the image pixel, the larger the number in the centroid. This assumes that the centroid of dark features are being located and that smaller numbers represent darker levels in the image. This centroid calculation is reasonably rotation insensitive. In other words, the centroid calculation identifies approximately the same location in the bounded character, independently of the angle of rotation of the image segment.

Figure 4:
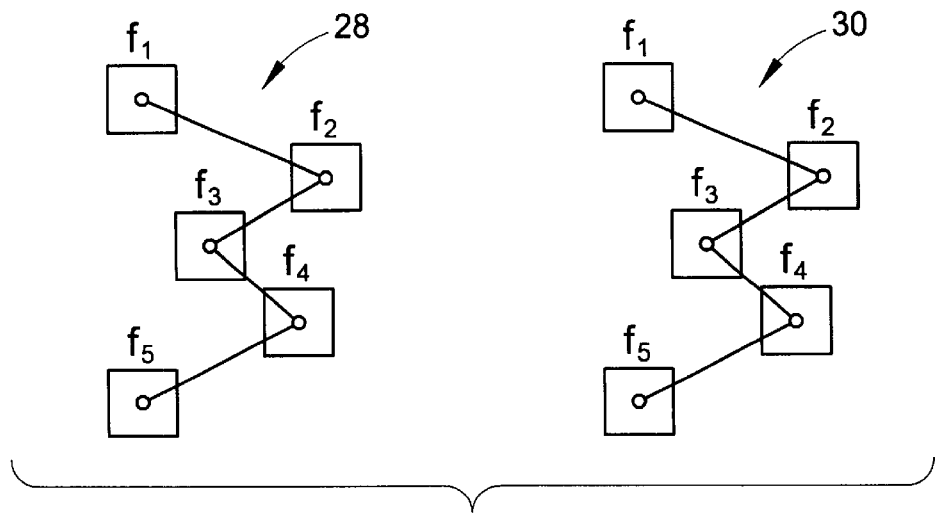
FIG. 4 illustrates a centroid that is determined for each user-selected image feature in the image segments of FIG. 3.

The magnification (scale), orientation, and translation of the two image segments 28, 20 can be determined from the centroid values (i.e. the calculated center locations) of the selected image segment features. FIG. 4 illustrates the two image segments 28, 30 in which each set of features has been selected. This collection of features represents an object whose position, size and orientation is known in each image segment. That is, the user has identified five image features and has indicated how the image features correspond between the two image segments. Therefore, it is known that feature $f_1$ (the character C) in image segment 28 is the same feature as $f_1$ (the character C) in image segment 30.

The magnification or scale difference, between the two image segments 28, 30 can be determined by calculating the distances between the individual features and taking the ratio of the two distances for each segment (step 80). So if, $d_{1i}$ is the distance in the first image segment 28 between the features $f_i$ and $f_{i+1}$, and $d_{2i}$ is the distance in the second image segment 30 between the features $f_i$ and $f_{i+1}$, then the magnification factor (m) is given by:

$$m = (\Sigma d_{2i}/d_{1i})/(n-1) \text{ for } i=1 \ldots n-1 \qquad \text{Eq.4}$$

Similarly, the orientation or angle of rotation between the two image segments 28, 30 can be determined by calculating the angles between the individual features and taking the differences of the features for each segment (step 90). So if $\theta_{1i}$ is the angle in image segment 28 between the features $f_i$ and $f_{i+1}$, and $\theta_{2i}$ is the angle in image segment 30 between the features $f_i$ and $f_{i+1}$, then the angle of orientation is given by:

$$\theta = (\Sigma(\theta_{2i} - \theta_{1i}))/(n-1) \text{ for } i=1 \ldots n-1 \qquad \text{Eq.5}$$

The calculation of the translation between the two image segments 28, 30 requires rotating and scaling one set of feature locations before calculating the differences in position. The translation can be determined from the transformation of coordinates for rotation and magnification. For instance, when the feature locations for image segment 30 are transformed by rotating back by angle ($\theta$) and reducing by magnification factor (m), then the vector difference (v) between the two image segments 28, 30 is given by:

$$v = (\Sigma r'_{2i} - r_{1i})/n \text{ for } i=1 \ldots n \qquad \text{Eq.6}$$

where $r'_{2i}$ is the vector location of feature $f_1$ in image segment 30 after it has been rotated back by angle ($\theta$) and reduced in size by magnification factor (m), and $r_{1i}$ is the vector location of feature $f_1$ in image segment 28 (step 100).

Once the stitching parameters (e.g. magnification, orientation, and translation) have been determined, the image data representing the image segments 28, 30 can be stitched or otherwise merged together electronically by determining the proper orientation, scale, and position of each image segment to fit with the others. These calculations are based on transformation formulae that are well-known to those of ordinary skill in the art (step 110). For instance, U.S. Pat. No. 5,649,032, titled "System for Automatically Aligning Images to Form a Mosaic Image", issued to Burt, et al., discloses a method for automatically determining overlap using correlation between the image segments and how to blend the segments together using gaussian pyramids. It assumes that there is no rotation difference between the segments. It is contemplated that the merged image data can be stored as one or more separate arrays of image data in the buffers/memories 20, or the image data can be merged together on the fly.

The merging of the image data representing the overlapping regions 28a, 30a can be accomplished by blending the two (or more) image segments 28, 30 together. For example, the overlapping regions can be blended by gradually shifting from using all of one image segment to using all of the other image segment, with a simple average of the two image segment pixels in the middle of the overlap region.

Thereafter, depending on the application, the merged image data representing the oversized document can be sent to the output section 24 of the document processing apparatus to be i) reduced and printed, ii) printed on large paper (such as with a wide-body printer), or iii) sent over a network, etc. (step 120).

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment(s), the invention is now claimed to be:

1. A method for generating image data representing an oversized document, comprising:

a) displaying image data representing a plurality of scanned image segments of an oversized document;

b) selecting a plurality of image features in an overlapping region of a first image segment and a plurality of image features in a corresponding overlapping region of a second image segment;

c) determining a centroid value for each of a plurality of the selected image features;

d) determining a set of correction values based on the centroid values; and e) merging image data representing the first image segment with image data representing the second image segment based on the set of correction values.

2. The method of claim 1, wherein step d) includes:

f) determining a scale difference value between a centroid value for a selected image feature of the first image segment and a centroid value for a corresponding image feature of the second image segment;

g) determining an orientation difference value between a centroid value for a selected image feature of the first image segment and a centroid value for a corresponding image feature of the second image segment; and h) determining a translation value between a centroid value for a selected image feature of the first image segment and a centroid value for a corresponding image feature of the second image segment.

3. An apparatus for generating image data representing an oversized document, comprising:
  means for displaying image data representing a plurality of scanned image segments of an oversized document;
  means for selecting a plurality of image features in an overlapping region of a first image segment and a plurality of image features in a corresponding overlapping region of a second image segment;
  means for determining a centroid value for each of a plurality of the selected image features;
  means for determining a set of correction values based on the centroid values; and
  means for merging image data representing the first image segment with image data representing the second image segment based on the set of correction values.

4. The apparatus of claim 3, wherein the set of correction value determining means includes:
  means for determining a scale difference value between a centroid value for a selected image feature of the first image segment and a centroid value for a corresponding image feature of the second image segment;
  means for determining an orientation difference value between a centroid value for a selected image feature of the first image segment and a centroid value for a corresponding image feature of the second image segment; and
  means for determining a translation value between a centroid value for a selected image feature of the first image segment and a centroid value for a corresponding image feature of the second image segment.

5. A method for merging together image data representing a plurality of image segments to form an oversized document, comprising:
  a) selecting a plurality of image features in an overlapping region of a first image segment and a plurality of image features in a corresponding overlapping region of a second image segment;
  b) determining a centroid value for each of the selected image features;
  c) determining a scale difference value between a selected image feature of the first image segment and a corresponding image feature of the second image segment based on the centroid values of the selected image feature of the first image segment and the corresponding image feature of the second image segment;
  d) determining an orientation difference value between a selected image feature of the first image segment and a corresponding image feature of the second image segment based on the centroid values of the selected image feature of the first image segment and the corresponding image feature of the second image segment;
  e) determining a translation value between a selected image feature of the first image segment and a corresponding image feature of the second image segment based on the centroid values of the selected image feature of the first image segment and the corresponding image feature of the second image segment; and
  f) merging image data representing the first image segment with image data representing the second image segment based on the scale difference value, the orientation difference value, and the translation value.

6. The method of claim 5, wherein step a) includes:
  g) bounding the plurality of image features in the first image segment and the plurality of image features in the second image segment with an input device.

7. The method of claim 6, wherein step b) includes:
  h) inverting each pixel intensity value that forms the bounded image features; and
  i) raising each of the inverted pixel intensity values to a third power.

8. The method of claim 5, wherein step a) further includes:
  g) scanning the first image segment and the second image segment into a document processing apparatus; and
  h) displaying the first image segment and the second image segment on a display screen.

9. The method of claim 5, wherein step a) further includes:
  g) selecting at least two image features in an overlapping region of a first image segment and at least two image features in a corresponding overlapping region of a second image segment.

10. The method of claim 5, wherein step a) further includes:
  g) selecting the plurality of image features in the first image segment in a particular order and selecting the plurality of image features in the second image segment in the same order.

11. The method of claim 5, wherein step f) includes:
  g) gradually shifting from the image data representing the first image segment to the image data representing the second image segment within the overlapping region.

12. The method of claim 5, further including:
  g) printing the merged image data.

13. The method of claim 12, further including:
  h) prior to step g) reducing the merged image data.

14. The method of claim 5, further including:
  g) transferring the merged image data over a network.

15. A document processing apparatus comprising:
  an input section adapted to obtain image data representing a plurality of image segments associated with an oversized document to be processed;
  a data storage section adapted to store the image data;
  a user interface adapted to display a first image segment and a second image segment and to obtain first feature selection data corresponding to the first image segment and second feature selection data corresponding to the second image segment; and
  a processor section adapted to:
    a) determine a centroid value for each of the first feature selection data and second selection data,
    b) determine a scale difference value between the first feature selection data and the second feature selection data based on the corresponding centroid values,
    c) determine an orientation difference value between the first feature selection data and the second feature selection data based on the corresponding centroid values,
    d) determine a translation value between the first feature selection data and the second feature selection data based on the corresponding centroid values, and
    e) merge the image data representing the plurality of image segments based on the scale difference value, the orientation difference value, and the translation value.

16. The apparatus of claim 15, wherein the user interface includes a data input device and the first and second feature selection data is obtained by bounding a plurality of image features in the first image segment and a plurality of image features in the second image segment with the input device.

17. The apparatus of claim 16, wherein the centroid values are obtained by inverting each pixel intensity value that forms the bounded image features, and by raising each of the inverted pixel intensity values to a third power.

18. The apparatus of claim 15, wherein the input section includes a scanner for digitizing portions of an oversized document.

19. The apparatus of claim 15, wherein the first feature selection data corresponds to at least two image features in an overlapping region of the first image segment and the second feature selection data corresponds to the same at least two image features in a corresponding overlapping region of the second image segment.

20. The apparatus of claim 15, wherein the first feature selection data is selected in a particular order and the second feature selection data is selected in the same order.

21. The apparatus of claim 15, wherein the image data representing the first image segment is gradually shifted to the image data representing the second image segment within the overlapping region.

22. The apparatus of claim 15, further including an output section adapted to print the merged image data.

23. The apparatus of claim 15, wherein the processor section is further adapted to reduce the merged image data.

24. The apparatus of claim 15, wherein the processor section is further adapted to transfer the merged image data over a network.

* * * * *